(12) United States Patent
Brown et al.

(10) Patent No.: US 8,432,600 B2
(45) Date of Patent: Apr. 30, 2013

(54) LIGHT BLOCKING APPARATUS FOR VEHICLE MIRROR ASSEMBLY

(75) Inventors: Alyn Brown, North Aurora, IL (US); James Wiff, Cologne, MN (US)

(73) Assignee: Control Solutions LLC, Aurora, IL (US)

( * ) Notice: Subject to any disclaimer, the term of this patent is extended or adjusted under 35 U.S.C. 154(b) by 649 days.

(21) Appl. No.: 12/512,858

(22) Filed: Jul. 30, 2009

(65) Prior Publication Data
US 2011/0026092 A1 Feb. 3, 2011

(51) Int. Cl.
*G02F 1/15* (2006.01)
(52) U.S. Cl.
USPC ........................................................ 359/263
(58) Field of Classification Search .................. 359/265, 359/267, 263, 884; 349/113
See application file for complete search history.

(56) References Cited

U.S. PATENT DOCUMENTS

| | | | |
|---|---|---|---|
| 3,519,742 A | 7/1970 | Bjelland |
| 4,033,677 A | 7/1977 | Tausch |
| 4,664,934 A | 5/1987 | Ito et al. |
| 4,750,834 A | 6/1988 | Fateley |
| 4,872,745 A | 10/1989 | Fujisawa et al. |
| 4,887,890 A | 12/1989 | Scherber |
| 4,947,291 A | 8/1990 | McDermott |
| 5,076,673 A | 12/1991 | Lynam |
| 5,105,303 A | 4/1992 | Ilhage |
| 5,115,848 A | 5/1992 | Malone |
| 5,128,799 A | 7/1992 | Byker |
| 5,255,163 A | 10/1993 | Neumann et al. |
| 5,261,722 A | 11/1993 | Staley et al. |
| 5,384,653 A | 1/1995 | Benson et al. |
| 5,412,492 A | 5/1995 | Zammit et al. |
| 5,438,452 A | 8/1995 | Gruber |
| 5,481,395 A | 1/1996 | Byker |
| 5,517,389 A | 5/1996 | Myers |
| 5,521,744 A | 5/1996 | Mazurek |
| 5,631,765 A | 5/1997 | Baur et al. |
| 5,659,423 A | 8/1997 | Schierbeek et al. |
| 5,681,103 A | 10/1997 | Remillard et al. |
| 5,729,379 A | 3/1998 | Allemand et al. |
| 5,763,050 A | 6/1998 | Hirmer |
| 5,829,870 A | 11/1998 | Remillard et al. |
| 5,994,840 A | 11/1999 | Forsdyke et al. |

(Continued)

OTHER PUBLICATIONS webBikeWorld. Akuma Electrochromatic Visor [online]. (Feb. 2008) [retrieved Feb. 2, 2009]. Retrieved from the Internet: <URL: http://www.webbikeworld.com/motorcycle-accessories/2008/electrochromatic-visor.htm>.

(Continued)

*Primary Examiner* — Joseph P Martinez
(74) *Attorney, Agent, or Firm* — McCracken & Frank LLC

(57) ABSTRACT

A mirror assembly is provided having a mirror for use in connection with a vehicle, such as a military combat vehicle. An electrically activatable material is positioned at the mirror of the vehicle. The electrically activatable material prevents the reflectivity of visible light off the mirror when the electrically activatable material is switched to a light-blocking state. A coupling device electrically couples the electrically activatable material to an electrical power source. An actuation device is adapted to switch the electrically activatable material of the vehicle mirror assembly to the light-blocking state in response to user operation such that the electrically activatable material prevents the reflectivity of visible light off the vehicle mirror to reduce the observability of the vehicle mirror.

61 Claims, 7 Drawing Sheets

U.S. PATENT DOCUMENTS

| | | | |
|---|---|---|---|
| 6,039,390 A | 3/2000 | Agrawal et al. | |
| 6,291,905 B1 * | 9/2001 | Drummond et al. | 307/10.1 |
| 6,429,961 B1 | 8/2002 | Harary et al. | |
| 6,493,128 B1 | 12/2002 | Agrawal et al. | |
| 6,583,919 B1 | 6/2003 | Mizutani et al. | |
| 6,588,026 B2 | 7/2003 | Meier et al. | |
| 6,703,981 B2 | 3/2004 | Meitzler et al. | |
| 6,876,479 B1 * | 4/2005 | Giri et al. | 359/273 |
| 6,963,437 B2 | 11/2005 | Bauer et al. | |
| 7,029,151 B2 | 4/2006 | Strazzanti | |
| 7,042,617 B2 | 5/2006 | Kosc et al. | |
| 7,349,144 B2 | 3/2008 | Varaprasad et al. | |
| 7,365,896 B2 | 4/2008 | Kuwabara et al. | |
| 7,440,205 B2 | 10/2008 | Malfait et al. | |
| 7,452,067 B2 | 11/2008 | Gross | |
| 7,894,117 B2 * | 2/2011 | Finlayson | 359/267 |
| 2004/0105264 A1 | 6/2004 | Spero | |
| 2004/0165267 A1 | 8/2004 | Oishi et al. | |
| 2005/0200934 A1 | 9/2005 | Callahan et al. | |
| 2008/0094851 A1 | 4/2008 | Engl et al. | |

OTHER PUBLICATIONS

Advanced Industrial Science and Technology. Successful Development of a Thin Film for a Switchable Mirror That Can be Switched Between Reflective and Transparent States [online]. (Dec. 2006) [retrieved Jun. 24, 2009]. Retrieved from the Internet: <URL: http://www.aist.go.jp/aist_e/latest_research/2007/20070129/20070129.html>.

Bill Kirtz, "Chameleon Windows Haven't Shown Their True Colors Yet", Glass Magazine (Oct. 2004), pp. 50-56.

DuPont TechnologyBank. Single Layer Electrochromatic Polymer Technology for Automotive and Architectural Glazing Light Control [online]. [retrieved Feb. 2, 2009]. Retrieved from the Internet: <URL: http://dupont.t2h.yet2.com/t2h/page/techpak?keyword=electrochromatic+polymer+film&id=41766&qid=1500702&sid=10&args=3%25091%25091500702%2509%2509electrochromatic%2Bpolymer%2Bfilm%2509%2509%2509-1>.

DuPont TechnologyBank. Single Layer Electrochromatic Polymer Technology for Automotive and Architectural Glazing Light Control [online]. [retrieved Feb. 2, 2009]. Retrieved from the Internet: <URL: http://dupont.t2h.yet2.com/t2h/page/techpak?keyword=electrochromatic+polymer+film&args=3%25091%25091500702%2509%2509electrochromatic%252Bpolymer%252Bfilm%2509%2509%2509-1&id=41766&qid=1500702&sid=10&ab0&page=novelty>.

Research Frontiers Inc. SPD-SmartGlass [online]. [retrieved Feb. 2, 2009]. Retrieved from the Internet: <URL:http://www.smartglass.com>.

Research Frontiers Inc. SPD-Smart Products—Overview [online]. [retrieved Feb. 2, 2009]. Retrieved from the Internet: <URL: http://www.smartglass.com/spd.asp>.

Research Frontiers Inc. SPD-Smart Products—Architectural [online]. [retrieved Feb. 2, 2009]. Retrieved from the Internet: <URL: http://www.smartglass.com/spd.asp?sec=architectural>.

Research Frontiers Inc. SPD-Smart Products—Aerospace [online]. [retrieved Feb. 2, 2009]. Retrieved from the Internet: <URL: http://www.smartglass.com/spd.asp?sec=aerospace>.

Research Frontiers Inc. SPD-Smart Products—Automotive [online]. [retrieved Feb. 2, 2009]. Retrieved from the Internet: <URL: http://www.smartglass.com/spd.asp?sec=automotive>.

Research Frontiers Inc. SPD-Smart Products—Marine [online]. [retrieved Feb. 2, 2009]. Retrieved from the Internet: <URL: http://www.smartglass.com/spd.asp?sec=marine>.

Research Frontiers Inc. SPD-Smart Products—Appliances [online]. [retrieved Feb. 2, 2009]. Retrieved from the Internet: <URL: http://www.smartglass.com/spd.asp?sec=appliances>.

Research Frontiers Inc. SPD-Smart Products—Eyewear [online]. [retrieved Feb. 2, 2009]. Retrieved from the Internet: <URL: http://www.smartglass.com/spd.asp?sec=eyewear>.

Research Frontiers Inc. SPD-Smart Products—Displays [online]. [retrieved Feb. 2, 2009]. Retrieved from the Internet: <URL: http://www.smartglass.com/spd.asp?sec=displays>.

Research Frontiers Inc. FAQs—Characteristics of Smart Products [online]. [retrieved Oct. 14, 2009]. Retrieved from the Internet: <URL: http://www.smartglass.com/faqs.asp?topic=100003>.

Aurora Cord & Cable Company. Aurora Cord & Cable: Blackout Driving Light [online]. [retrieved Jul. 20, 2009]. Retrieved from the Internet: <URL: http://www.auroracord.com/products/blackoutdrivinglight.cfm>.

Gentex Corporation. Homepage [online]. [retrieved Apr. 8, 2009]. Retrieved from the Internet: <URL: http://www.gentex.com>.

Gentex Corporation. Exterior Mirrors [online]. [retrieved Oct. 14, 2009]. Retrieved from the Internet: <URL: http://www.gentex.com/auto_plo_exterior.html>.

Integrated Publishing. Blackout Lights [online]. [retrieved Oct. 14, 2009]. Retrieved from the Internet: <URL: http://www.tpub.com/content/construction/14273/css/14273_78.htm>.

SwitchLite Privacy Glass. Home [online]. [retrieved Oct. 14, 2009]. Retrieved from the Internet: <URL: http://www.switchfite.com/home.html>.

SAGE Electrionics,'Inc. The Power to Change [online]. [retrieved Oct. 14, 2009]. Retrieved from the Internet: <URL: http://www.sage-ec.com/>.

E Ink Corporation. Low Power, Electronic Paper Displays [online]. [retrieved Oct. 14, 2009]. Retrieved from the Internet: <URL: http://www.eink.com>.

ChromoGenics AB. Homepage [online]. [retrieved Oct. 14, 2009]. Retrieved from the Internet: <URL: http://www.chromogenics.se/index_eng.htm>.

* cited by examiner

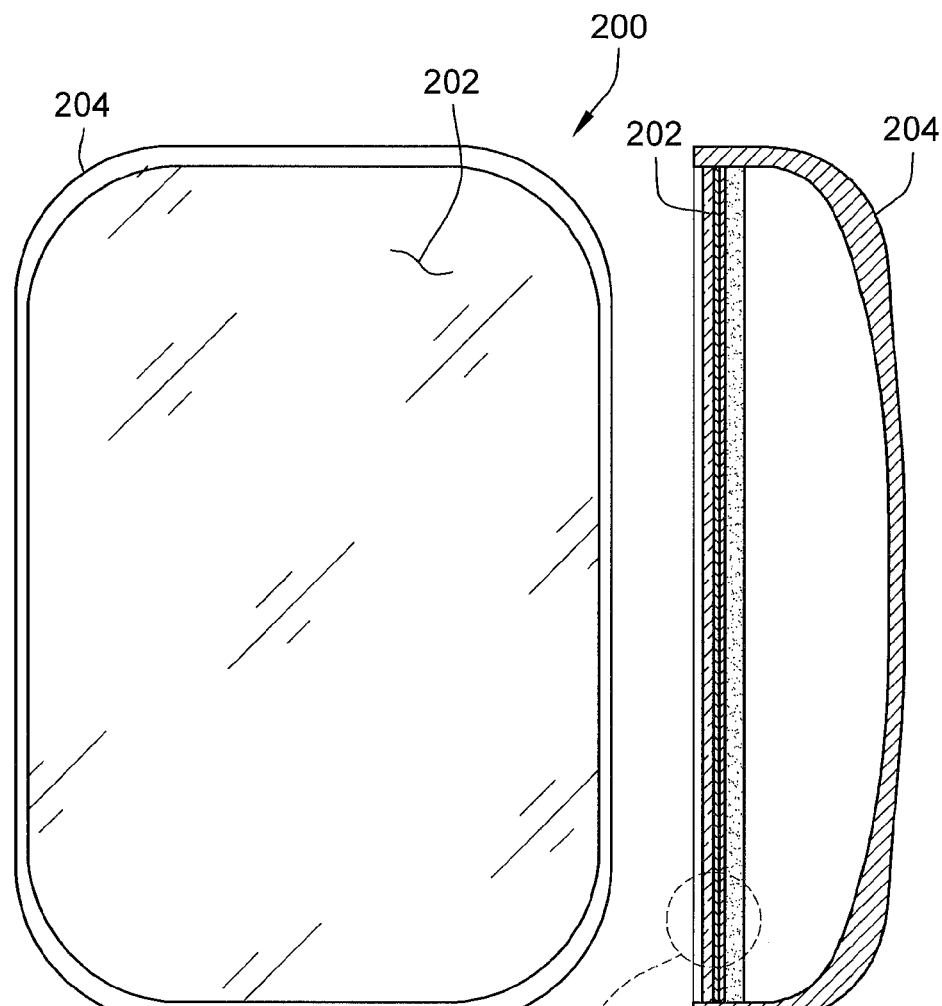
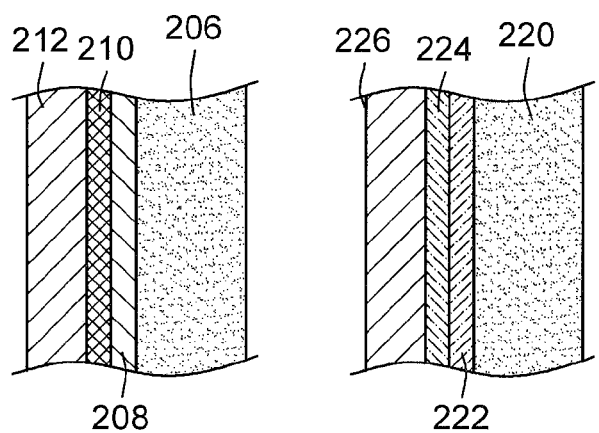
FIG. 2A  FIG. 2B
FIG. 2C  FIG. 2D

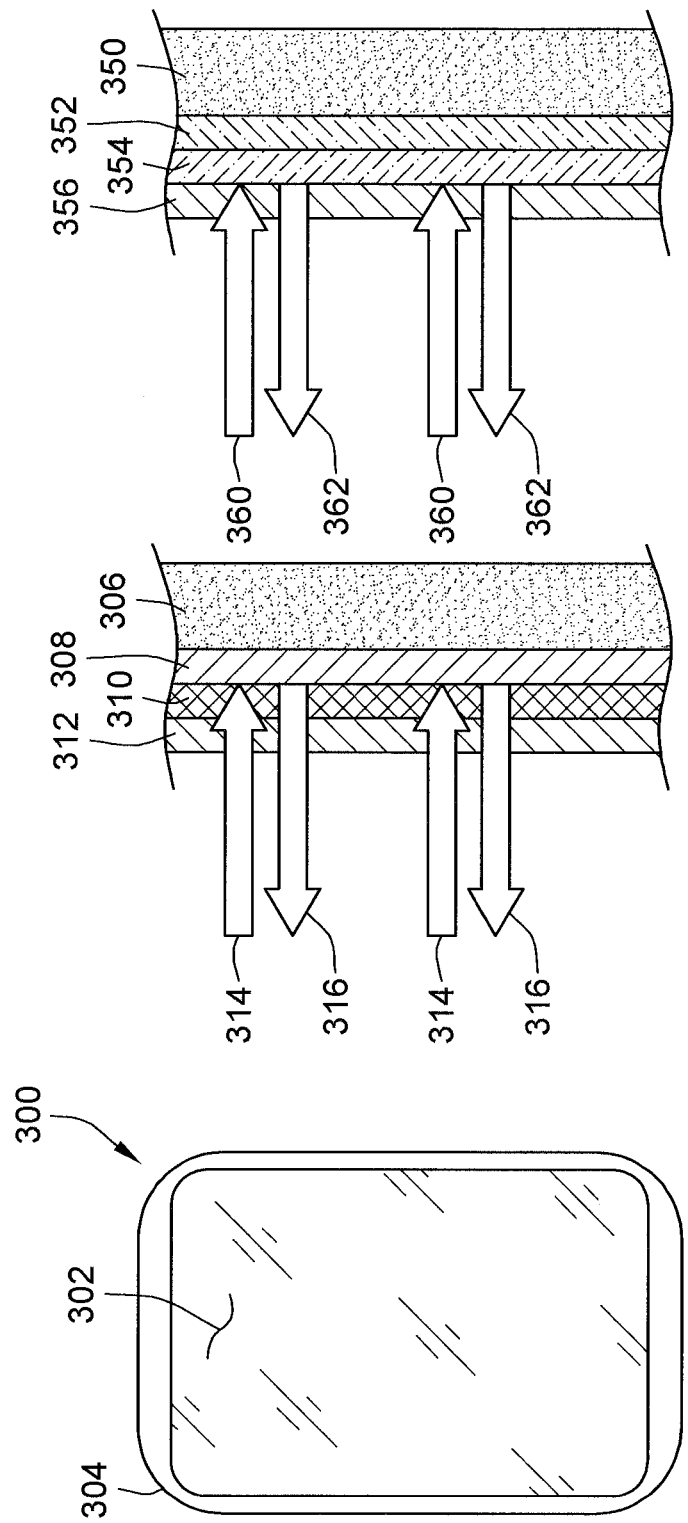

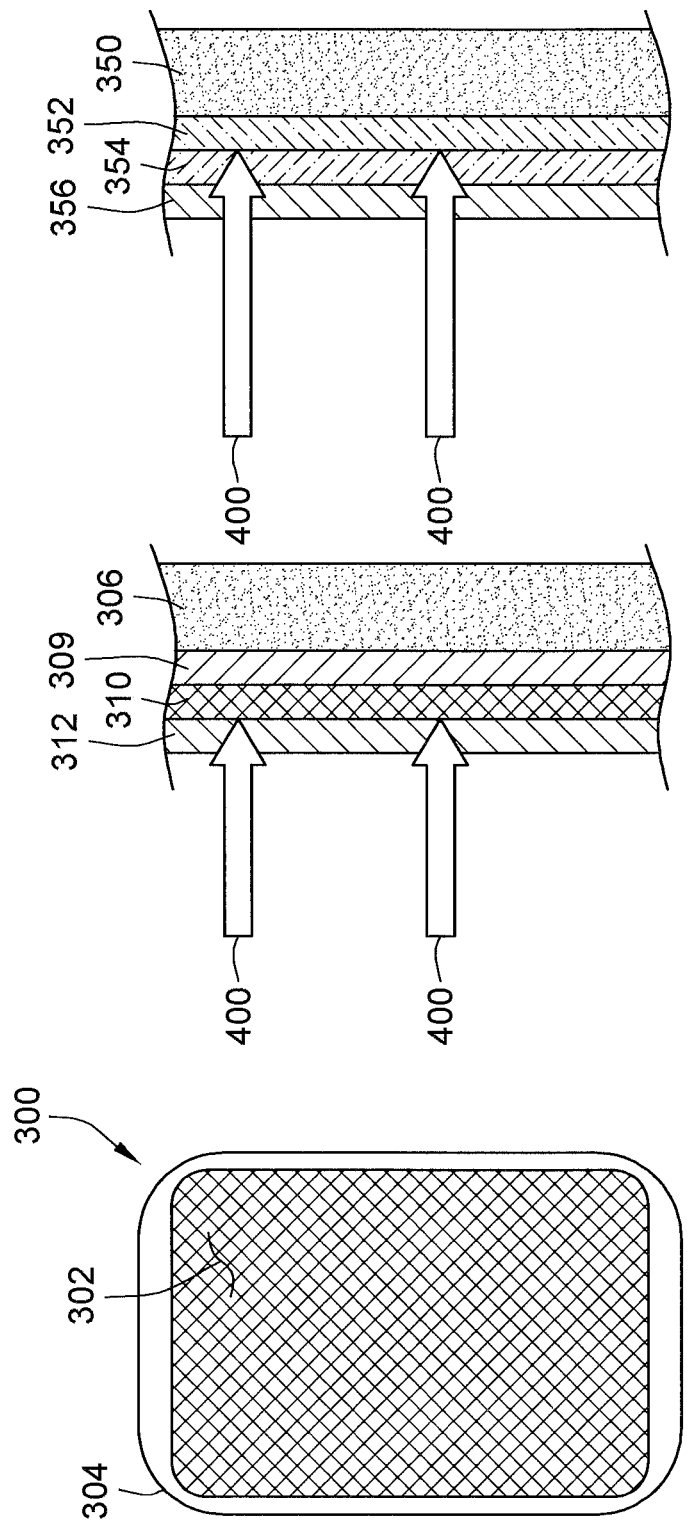

LIGHT BLOCKING APPARATUS FOR VEHICLE MIRROR ASSEMBLY

FIELD OF THE INVENTION

The invention relates to vehicle mirror assemblies such as external or internal mirror assemblies of vehicles. In particular, the invention relates to mirror assemblies that are adapted to selectively block out light from reflecting off mirror surfaces such as mirrors for military combat vehicles or vehicles used for security purposes.

BACKGROUND

Conventional mirrors are designed to reflect ambient light at all times. While this may be desirable in the daytime, trailing vehicles can often blind the driver at night by not having their headlights dimmed and shining the headlights into the mirrors of the driver's vehicle. One approach to address this is to provide two reflective surfaces with different reflectivity characteristics and provide a mechanical adjustment on the mirror to allow for day and nighttime driving. Another approach uses a wedge shaped mirror such that maximum reflectivity (day mode) is accomplished when the image is reflected off the rear portion of the mirror which has the reflective coating. When an alternative mode is desired, such as a night mode, the mirror is adjusted such that the reflected light is reflected off the front glass which has a lower reflectivity than the rear portion.

Other approaches are used with interior vehicle mirrors. These mirrors operate in a manner such that they dim reflected light from trailing vehicles. The mirrors are controlled to react to an amount of ambient light as read by light sensors and are able to adjust the level of reflectivity to reduce the chances of a driver from being blinded by trailing vehicles at night.

For certain vehicles, such as military vehicles, it is desirable to provide total non-reflectivity of the mirror during specific times, such as during certain combat operations. For instance, covert and special operations missions are often executed at night and the ability to perform such missions without being observed by enemy elements is key. To prevent any reflectivity off the mirrors during such combat missions, the mirrors are often either removed entirely or moved to a position that masks their reflective surface from observation. In some situations, duct tape may also be placed over the mirrors to prevent light from reflecting. The ability to reduce vehicle mirror observability may also be desirable for vehicles used for security purposes. Security vehicles may be vehicles used for special operations purposes, police operations, or private security purposes. The conventional approaches that have been used to prevent light reflection off a vehicle mirror defeat the purpose of having a vehicle mirror and require the time and effort of military or security personnel to move or remove (and then re-install) the mirrors as needed.

Accordingly, there is a need for vehicle mirrors that are adapted to selectively block the reflectivity of ambient light off the mirrors in a convenient manner.

SUMMARY

A mirror assembly is provided having a mirror with a reflective surface for use in connection with a vehicle, such as a military combat or security vehicle. An electrically activatable material is positioned at the mirror of the vehicle. The electrically activatable material prevents the reflectivity of visible light off the mirror when the electrically activatable material is in a light-blocking state. A coupling device electrically couples the electrically activatable material to an electrical power source. An actuator is adapted to switch the electrically activatable material to the light-blocking state in response to user operation such that the electrically activatable material prevents the reflectivity visible of light off the vehicle mirror to reduce the observability of the vehicle mirror.

A vehicle mirror assembly is also provided in which the mirror assembly employs an electrically activatable mirror. The electrically activatable mirror has an electrically activatable material that switches between a light-transmissive state and a reflective state. A coupling device couples the electrically activatable material to an electrical power source. An actuator is adapted to prompt switching of the electrically activatable material of the mirror of the vehicle between the light-transmissive state and the reflective state.

A method of blocking visible light from reflecting off a reflective surface of a mirror in a mirror assembly for a vehicle is also provided. An electrically activatable material is positioned at the mirror. An electrical power source is coupled with the electrically activatable material of the mirror. The electrically activatable material is switched from a light-transmissive state (in which light is able to pass through the electrically activatable material) to a light-blocking state in which the electrically activatable material prevents the reflectivity of visible light off the vehicle mirror to reduce observability of the vehicle mirror.

In another example, a method of utilizing a mirror assembly for a vehicle is also provided. An electrically activatable mirror having an electrically activatable material is provided in which the electrically activatable material is switchable between a light-transmissive state and a reflective state. The electrically activatable material is coupled to an electrical power source. The electrically activatable material of the mirror is prompted to be switched between the light-transmissive state and the reflective state.

BRIEF DESCRIPTION OF THE DRAWINGS

FIG. 2A is a front view of an example of a mirror assembly having light blocking capabilities;

FIG. 2B is a side cross-sectional view of the mirror assembly of FIG. 2A;

FIG. 2C is a cross-sectional view showing detail of section 2C in FIG. 2B;

FIG. 2D is a cross-sectional view showing detail of section 2C in FIG. 2B in another example implementation;

FIG. 3A is a front view of an example of a mirror assembly in a reflective state;

FIG. 3B is a side cross-sectional view of a portion of the mirror assembly shown in FIG. 3A in a reflective state in one example implementation;

FIG. 3C is a side cross-sectional view of a portion of the mirror assembly shown in FIG. 3A in a reflective state in another example implementation;

FIG. 4A is a front view of an example of a mirror assembly in a non-reflective state;

FIG. 4B is a side cross-sectional view of a portion of the mirror assembly shown in FIG. 4A in a non-reflective state in one example implementation;

FIG. 4C is a side cross-sectional view of a portion of the mirror assembly shown in FIG. 4A in a non-reflective state in another example implementation;

DETAILED DESCRIPTION

Figure 1:
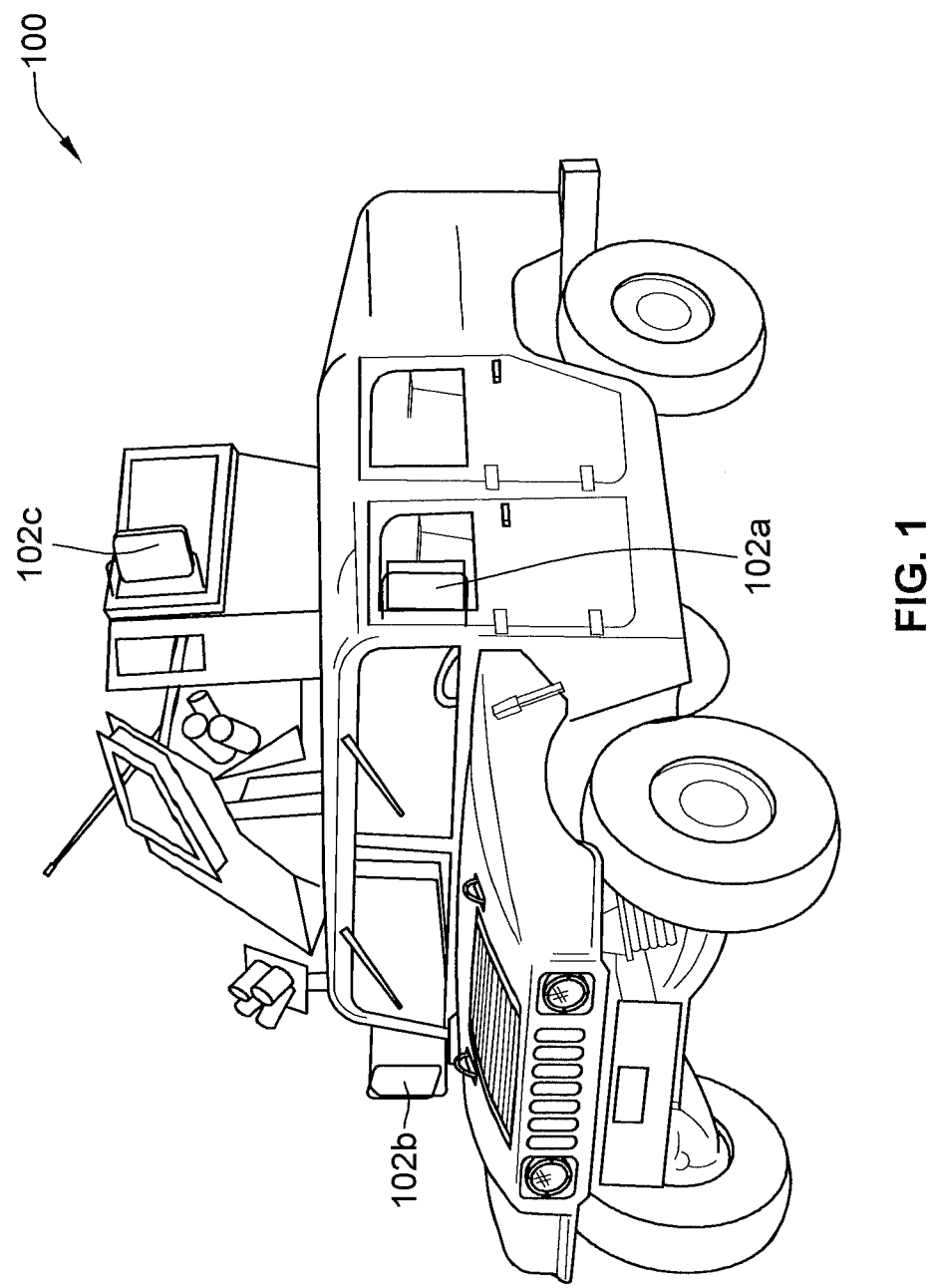
FIG. 1 is a perspective view of a vehicle having mirror assemblies with light blocking capabilities.

FIG. 1 is a perspective view of a vehicle 100 having mirror assemblies 102a,b,c with light blocking capabilities. The vehicle 100 may be, for example, a security vehicle, a military vehicle such as a High Mobility Multipurpose Wheeled Vehicle (HMMWV, or "Hummvee"), or any other vehicle that may be used in conditions in which it is desirable that the vehicle remain undetectable. For example, a Hummvee, or other military transport vehicles, may be used to carry military personnel into areas of battlefield conditions. At night, it is desirable to remain undetectable to any enemy personnel that may be in the area. The military vehicle may turn its lights off. Current military ground vehicles typically use mirrors to permit drivers to see to the side of the vehicle and behind the vehicle. The vehicle 100 in FIG. 1 may also have mirrors for a gunner to use to see behind the vehicle 100. When the lights are turned off while approaching battlefield conditions, the mirrors may reflect incident light thereby risking detection by enemy personnel.

In the military vehicle 100 in FIG. 1, for example, a driver or passenger may activate a driver-side mirror assembly 102a, a passenger-side mirror assembly 102b, and a gunner mirror assembly 102c to avoid detection due to incident light reflections from the mirrors. The mirror assemblies 102a,b,c may be configured to switch from a reflective state to a non-reflective state. The mirror assemblies 102a,b,c may include an electro-active material connected to a switch and a power supply to provide the user with the ability to switch the mirror assemblies from a reflective to a non-reflective state, and vice versa.

FIG. 2A is a front view of an example of a mirror assembly 200 having light blocking capabilities. FIG. 2B is a side cross-sectional view of the mirror assembly 200 of FIG. 2A. The mirror assembly 200 in FIG. 2A may include an electrically activatable mirror 202 supported by a backshell 204. The electrically activatable mirror 202 may be connected to an electrical circuit to provide user control over whether or not the mirror assembly is in a reflective or non-reflective state. For example, the electrically activatable mirror 202 may be electrically coupled to a switch at an operator panel accessible by a user of the vehicle. An actuation device to prompt activation of the electrically activatable mirror 202 may also be positioned adjacent to the minor. In conditions in which the driver of the vehicle desires to be undetectable, the driver or passenger may engage an actuator to darken the electrically activatable mirror 202. The electrically activatable mirror 202 may then inhibit visible light from passing through an electrically activatable film disposed in the mirror 202.

FIG. 2C is a cross-sectional view showing detail of section 2C in FIG. 2B. As shown in FIG. 2C, the electrically activatable mirror 202 includes a protective material or substrate 206, a reflective surface 208, an electrically activatable material 210, and a clear protective layer such as a glass or plastic substrate 212. The substrate 206 may provide a supporting structure for the other thinner and more fragile layers. The substrate 206 may not be needed if the other layers are sufficiently durable to provide their own support. The reflective surface 208 may be any material that may serve as a mirror.

The electrically activatable material 210 may be any material that switches from a light-transmissive state to a blackout state when energized or de-energized. In the light-transmissive state, the electrically activatable material 210 allows light to pass through to the reflective layer 208. In the light-blocking state, the electrically activatable material 210 blocks light from reaching the reflective material thereby inhibiting its reflection. Materials that may be used for the electrically activatable material 210 include an electrochromatic polymer (ECP) film, materials used in liquid crystal displays (LCD), and/or organic materials, such as organic materials that may be used in LCDs. One example type of ECP material activates when a voltage of about 1 VDC is applied to the film. In another example, a suspended particle device (SPD) film may be used and controlled by a circuit that includes an inverter that produces AC voltage to drive the film.

The electrically activatable material may be provided in various constructions, such as a film that can be disposed between transparent layers. Other material constructions may use a vapor deposition process on two adjacent faces of two layers of material and some with additional liquid material in between, for example. Electrical activation may be applied to the two layers, for example, causing migration of certain elements to one layer or the other producing a desired effect. Alternatively, the electrically activatable material may include phase dispersed liquid crystals (PDLCs).

As seen, the electrically activatable material 210 when switched to a state in which light transmission is inhibited is used to inhibit the reflectivity of visible light off the vehicle mirror 202 to prevent observability of the mirror 202. The electrically activatable material 210 may, for example, be adapted to block out substantially all ambient light from reflecting off the mirror. In other embodiments, the electrically activatable material 210 may selectively pass light of a particular spectrum (such as light within the infrared spectrum) to the reflective surface 208 of the electrically activatable mirror 202 and block light from reflecting at other spectrum ranges. For example, when in a light-blocking state, the electrically activatable material may prevent reflection of visible light within the visible light spectrum from reflecting off the mirror 202. The electrically activatable material 210, for instance, may selectively pass light ranging from 700 nanometers to 1200 nanometers and block light outside of this spectrum when activated to a light-blocking or blackout state.

In general, the film determines how the electrically activatable mirror 202 is activated. The scenarios may include, for example:

1. A film that is energized to a blackout state;
2. A film that is de-energized to a blackout state; and
3. A film that is switched to a blackout state by reversing polarity.

In one example, the film may include multiple layers each having specific functions. For example, the film may include an electrochromophore, an electrolyte layer, and an ion storage layer. In such films, the electrolyte layer is typically a liquid or a gel. In another example, the film may be a rigid or flexible electrochromic polymer that may be cast from solution on a glass or polyethylene terephthalate (PET) substrate. The assembly may then be heated under pressure to laminate the structures. The laminated assembly may include optically transparent electrodes, such as for example, indium tin oxide (ITO) layers that may be deposited on the glass or PET substrate and configured for connection to a power supply. In certain embodiments, two or more layers of the film placed adjacent to one another may be used to achieve enhanced light blocking capabilities.

In another implementation, the film may include electrochromic glazing consisting of five thin-film ceramic layers coated directly onto glass. Electrochromic glazing may be implemented similar to low-emissivity glazing used to make energy efficient windows, but in a circuit that enables switching between light transmission or light blocking as desired.

In another implementation, the film may a suspended particles device (SPD), which uses small light-absorbing particles, otherwise known as "light valves." For example, a SPD may be sandwiched between glass or plastic layers and connected via electrical leads to an AC power source. In the 'off' state, the particles are randomly distributed in the SPD and block light incident on the glass or plastic wall from passing through. In the 'on' state, the particles are aligned and allow the incident light to pass through.

In another implementation, a liquid-crystal sheet may be bonded between two layers of glass. The liquid crystal sheet may be connected to a power source. When switched to the 'on' state, the voltage rearranges the liquid-crystal molecules to allow light to pass through the glass. When switched to the 'off' state, the liquid-crystal molecules disperse light making the device opaque.

In yet another implementation, the electrically-activatable material may switch between clear and a translucent, but "cloudy" state. One example material that may be used is the Onyx™ coating material used for optical shutters made by Citala™.

It is to be understood that the light transmission states between which the electrically-activatable material is switched may be anywhere from 0% and 100% transmissive, or between 0% and 100% blocking. Selected electrically-activatable materials may not block 100% of visible light, but may block a substantial amount of visible light, which shall mean a sufficient amount for its intended application. Selected materials may also be configured to block a selected percentage of light.

FIG. 2D shows another implementation in which a different electronically activatable material is used. Section 2C of FIG. 2B as seen in the example in FIG. 2D includes a protective material or substrate 220, a light-absorbing material 222, a switchable mirror 224, and a clear cover layer such as a glass or plastic layer 226. In the example shown in 2C of FIG. 2D, the switchable mirror 224 may be switched from a light-transmissive state to a reflective state. In one example, the switchable mirror 224 may switch from reflective in a de-energized state to light-transmissive in an energized state. In another example, the switchable mirror 224 may switch from light-transmissive in a de-energized state to reflective in an energized state.

In one example of an implementation according to FIG. 2D, the switchable mirror 224 may be made of a solid-state thin film device made from a liquid crystal material, which can be rapidly switched between pure reflection, half-reflection and light-transmissive (such as transparent) states by changing the electrical state. An example of this type of device having switchable electronically activatable material includes the e-TransFlector™ device from Kent Optronics, Inc.

In another alternative example, the switchable mirror 224 may be thin films of magnesium-titanium alloy separated by a space into which a gas may be introduced to provide the switching between transparency and reflectivity. For example, a gas containing hydrogen may switch the film to a light-transmissive state. A gas containing oxygen may be introduced to switch the film to a reflective state. An example of a switchable mirror 224 that may be used is a switchable mirror made by the Japan National Institute of Advanced Industrial Science and Technology (AIST). The introduction of the gas into the space may be controlled electrically by a switch that blocks oxygen from an oxygen gas container allowing introduction of hydrogen from a hydrogen container in one state, and blocks the hydrogen allowing oxygen in the other state. For example, a gas cartridge containing oxygen and a gas cartridge containing hydrogen may have outlets connected to the space between the thin film layers. The outlets may be separated by an actuator, such as a solenoid, or an electrically actuated Y-valve that switches open and closed states of the outlets of the two gas cartridges. In one state, the actuator opens the outlet from the hydrogen cartridge to introduce the hydrogen into the space while blocking the oxygen outlet. In the other state, the actuator opens the outlet from the oxygen cartridge to introduce the oxygen into the space while blocking the hydrogen outlet.

FIGS. 3A, 3B and 3C through FIGS. 6A and 6B illustrate operation of the mirror assemblies described above with reference to FIGS. 1 and 2. FIG. 3A is a front view of an example of a mirror assembly 300. The mirror assembly 300 in FIG. 3A is shown in a reflective state and includes an electrically activatable mirror 302 supported in a backshell 304. FIG. 3B is a side cross-sectional view of a portion of the mirror assembly shown in FIG. 3A illustrating operation of the electrically activatable mirror 302 in a reflective state. The electrically activatable mirror 302 in the embodiment of FIG. 3B includes a substrate 306, a reflective layer 308, an electrically activatable material 310, and a glass or plastic layer 312. In the reflective state, incident light, shown in FIG. 3B as incident light arrows 314 pass through the plastic or glass layer 312 and through the electrically activatable material 310 to reflect off the reflective layer 308. The reflected light is shown in FIG. 3B as reflected light arrows 316.

FIG. 3C is a side cross-sectional view of a portion of the mirror assembly 300 shown in FIG. 3A illustrating operation of the electrically activatable mirror 302 in a reflective state. The electrically activatable mirror 302 in the embodiment of FIG. 3C includes a substrate 350, a light-absorbing layer 352, a switchable mirror material 354, and a glass or plastic layer 356. The electrically activatable mirror 302 in FIG. 3C is in a reflective state when de-energized. In the reflective state, incident light, shown in FIG. 3C as incident light arrows 360 pass through the plastic or glass layer 356 to reflect off the electrically activatable switchable mirror material 354, shown in FIG. 3C as reflected light arrows 362.

FIG. 4A is another front view of the mirror assembly 300, which includes an electrically activatable mirror 302 supported in a backshell 304. FIG. 4A shows the mirror assembly 300 in a non-reflective state. FIG. 4B is a side cross-sectional view of a portion of the mirror assembly 300 shown in FIG. 4A illustrating operation of the electrically activatable mirror 302 in a non-reflective state. In the non-reflective state, incident light, shown in the embodiment of FIG. 4B as incident light arrows 400 pass through the plastic or glass layer 312 and stop at the electrically activatable material 310 where it is blocked.

FIG. 4C is a side cross-sectional view of a portion of the mirror assembly 300 shown in FIG. 3C illustrating operation of the electrically activatable mirror 302 in a light-non-reflective state. The electrically activatable mirror 302 in FIG. 4C is in a light-non-reflective state when energized. In the light-non-reflective state, incident light, shown in the embodiment of FIG. 4C as incident light arrows 450 pass through the plastic or glass layer 356 and through the switchable mirror material 354 to stop at the light-absorbing material 352, which absorbs the light.

Figure 5A:
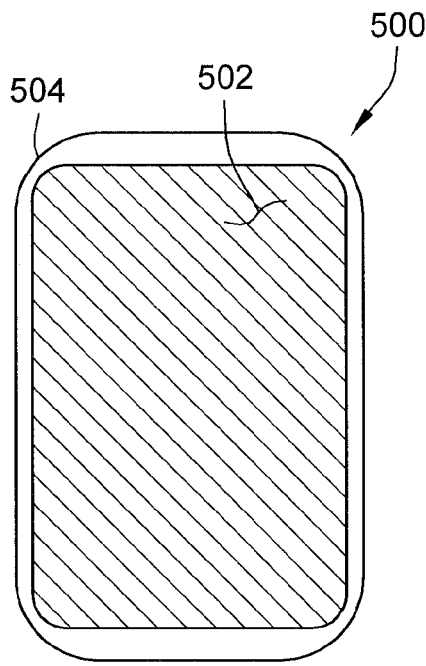
FIG. 5A is a front view of another example of a mirror assembly having modified blackout capabilities.
Figure 5B:
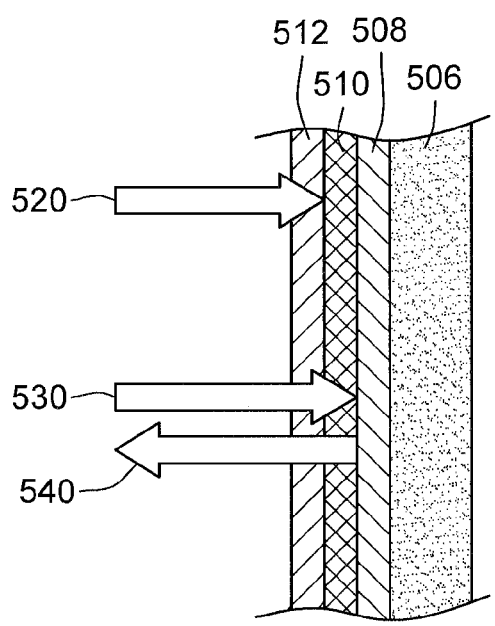
FIG. 5B is a side cross-sectional view of a portion of the mirror assembly shown in FIG. 5A.

FIG. 5A is another front view of another example of a mirror assembly 500, which includes an electrically activatable mirror 502 supported in a backshell 504. FIG. 5A shows the mirror assembly 500 in a state in which a selected range of wavelength is blocked. For example, visible light may be blocked, but light in a different wavelength range, such as infrared, may be allowed to reflect. FIG. 5B is a side cross-sectional view of a portion of the mirror assembly 500 shown in FIG. 5A illustrating operation of the electrically activatable mirror 502 in the visible light-non-reflective state. In the visible light-non-reflective state, incident light, shown in FIG. 5B as incident visible light arrows 520 pass through the plastic or glass layer 512 and stop at the electrically activatable material 510 where it is blocked. The electrically activatable mirror 502 may also receive infrared light, shown in FIG. 5B as incident infrared light arrows 530. The electrically activatable mirror 502 may pass the infrared light through the electrically activatable material 510 to be reflected off the reflective surface 508, as shown by arrows 540. In one example, the electrically activatable mirror 502 may include an electrically activatable material 510 that blocks visible light while allowing infrared light to pass when de-energized; and when energized, the material may allow all light to pass.

Figure 6A:
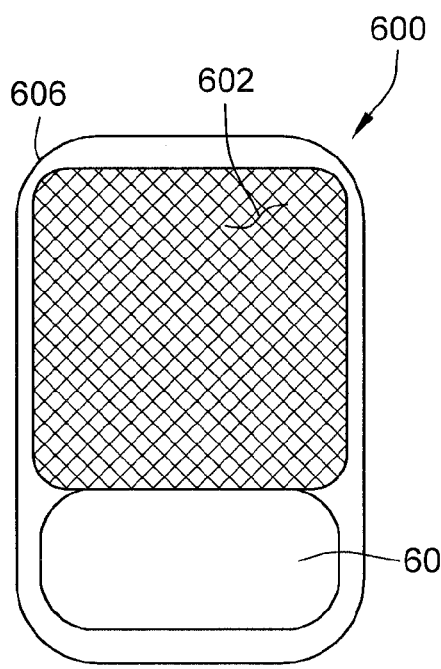
FIG. 6A is a front view of another example of a mirror assembly having blackout capabilities.
Figure 6B:
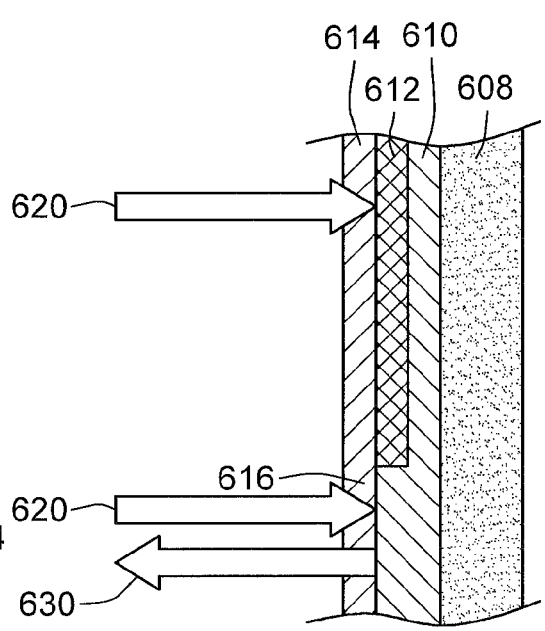
FIG. 6B is a side cross-sectional view of a portion of the mirror assembly shown in FIG. 6A.

FIG. 6A is a front view of another example of a mirror assembly 600 having blackout capabilities. The mirror assembly 600 in FIG. 6A includes a first mirror portion 602 and a second mirror portion 604 supported in a backshell 606. The first mirror portion 602 may be an electrically activatable mirror 602 and the second mirror portion 604 may be a plain mirror that reflects all light. FIG. 6B is a side cross-sectional view of a portion of the mirror assembly shown in FIG. 6A. FIG. 6B shows the mirror assembly 600 having a substrate layer 608, a first reflective layer 610, an electrically activatable layer 612, a glass or plastic layer 614, and a second reflective layer 616. The electrically activatable layer 612 may extend as much as needed to include the first mirror portion 602 in FIG. 6A. The second reflective layer 616 may extend as much as needed to include the second mirror portion 604. In a light-blocking state, the electrically activatable layer 612 may block the incident light, shown in FIG. 6B as incident light arrows 620 to prevent reflection off the first reflective layer 610. The incident light 620 may however reflect off the second reflective layer 616 as shown by reflected light arrows 630.

FIG. 7 is a schematic circuit diagram illustrating operation of an example mirror assembly. The schematic circuit in FIG. 7 shows a circuit 700 that includes a power supply 702 as an electrical power source, an electrical coupling device 704, and an electrically activatable mirror 706. The electrical coupling device 704 may be any device adapted to electrically couple the electrically activatable material in the mirror 706 to the power supply 702. The electrical coupling device 704 in FIG. 7 is shown as a switch that may be set to one of two states: State A or State B. In State A, the electrical coupling device 704 is open disabling the transfer of power from the power supply 702 to the electrically activatable mirror 706. State A is shown in FIG. 7 to allow incident light to pass through the electrically activatable mirror 706. State A represents normal operation in the example illustrated by FIG. 7. In operation, the light transmitted through the electrically activatable mirror 706 is reflected off a reflecting layer to permit the mirror assembly to operate as a mirror.

When the electrical coupling device 704 is closed to State B, power is coupled from the power supply 702 to the electrically activatable mirror 706 to inhibit incident visible light from passing through the electrically activatable material of the electrically activatable mirror 706. It is noted that the example shown in FIG. 7 assumes that the electrically activatable mirror 706 includes the electrically activatable material that inhibits light when electrically energized. That is, the electrically activatable material becomes opaque upon being electrically energized and the electrically activatable material becomes transparent upon being electrically de-energized. The electrically activatable material, for example, may become electrically energized upon reaching a voltage potential threshold sufficient to switch the electrically activatable material to a light-blocking state.

In an example in which the electrically activatable material blocks light when electrically de-energized, States A and B would provide the opposite operation as that indicated above. That is, the electrically activatable material becomes opaque upon being electrically de-energized and the electrically activatable material may become transparent upon being electrically energized. In this example, the electrically activatable material may become electrically de-energized upon removal of the voltage potential threshold to switch the electrically activatable material to a light-blocking state.

The electrical coupling device 704 in FIG. 7 is depicted with an actuator 704a, or actuation device, illustrating alternative ways to change the state of the electrical coupling device 704. For example, the electrical coupling device 704 may be an on/off switch in a control panel accessible by a user in the cabin of the vehicle. The user may manually switch the electrical coupling device 704 from off to on, or vice versa depending on whether the user desires to be detectable. Referring to the example described above, the user may utilize the actuation device 704a to prompt switching from State A (off) to State B (on) to block light from the mirror. The actuator 704a may be positioned adjacent to the mirror in some example embodiments.

The switch actuator 704a may also be implemented as a toggle switch, a button, an actuator on a touch panel screen, or a sensor such as a photocell sensor with switch capabilities upon sensing light activity. The actuation device 704a may be any actuator employed to initiate change of operation modes.

The switch actuator 704a may be a hardwired switch, or a software controlled switch, or a wireless control. For example, the switch actuator 704a may be an electronic switch connected to a controller that controls the electrically activatable mirror 706 systematically. For example, a control panel may be configured to place a vehicle in a battlefield condition such that activation of the electrically activatable mirror 706 is one function performed to place the vehicle in battlefield condition. In another example, the switch actuator 704a may include a common light switch that is in battlefield mode when switched to one state to both darken light modules of the vehicle as well as block light from the vehicle mirrors. The electrical coupling device 704 may also be implemented using a wireless connection to a control panel that may or may not be located in the vehicle itself. In alternative arrangements, electrical coupling device 704 may simply be an electrical conductor, such as a cable or copper wiring to electrically couple the electrically activatable material to a power source 702.

The power source 702 may include the vehicle power supply coupled to the electrically activatable mirror 706 via a control panel in the vehicle. The power supply 702 may also include a vehicle battery coupled via a control panel of the vehicle. The power supply 702 may also include an accessory battery coupled via a control panel adapted to re-charge the accessory battery based on conditions of a vehicle battery.

Figure 7A:
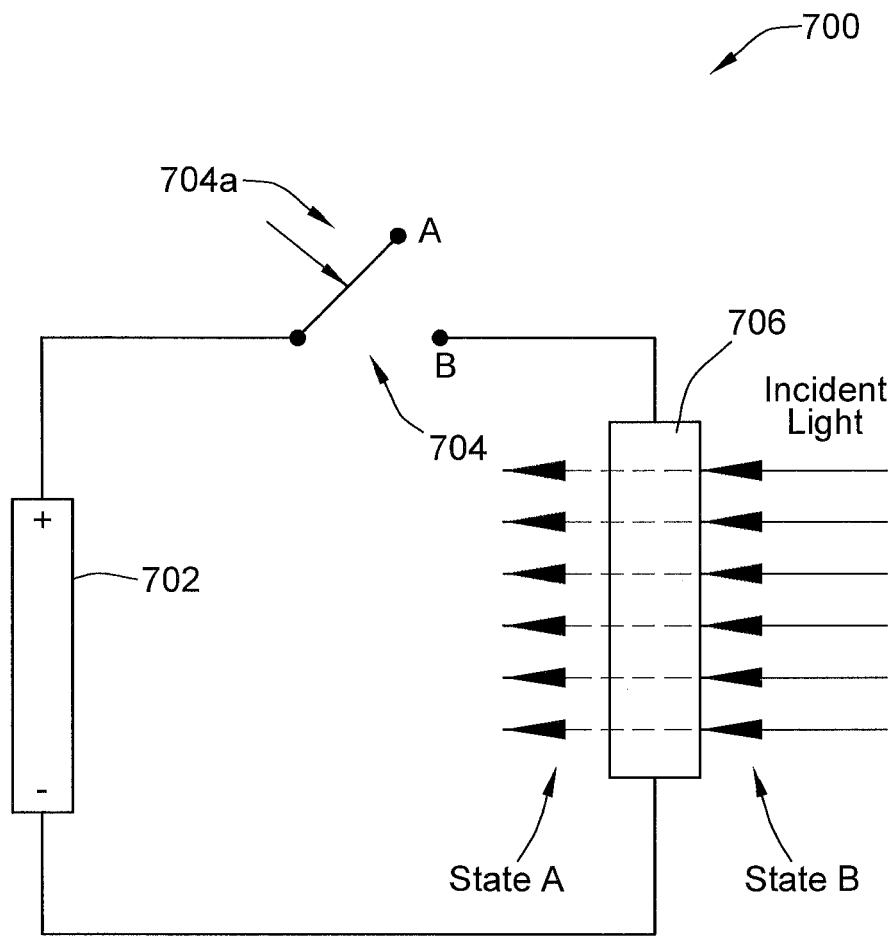
FIG. 7A is a schematic circuit diagram illustrating operation of an example mirror assembly.
Figure 7B:
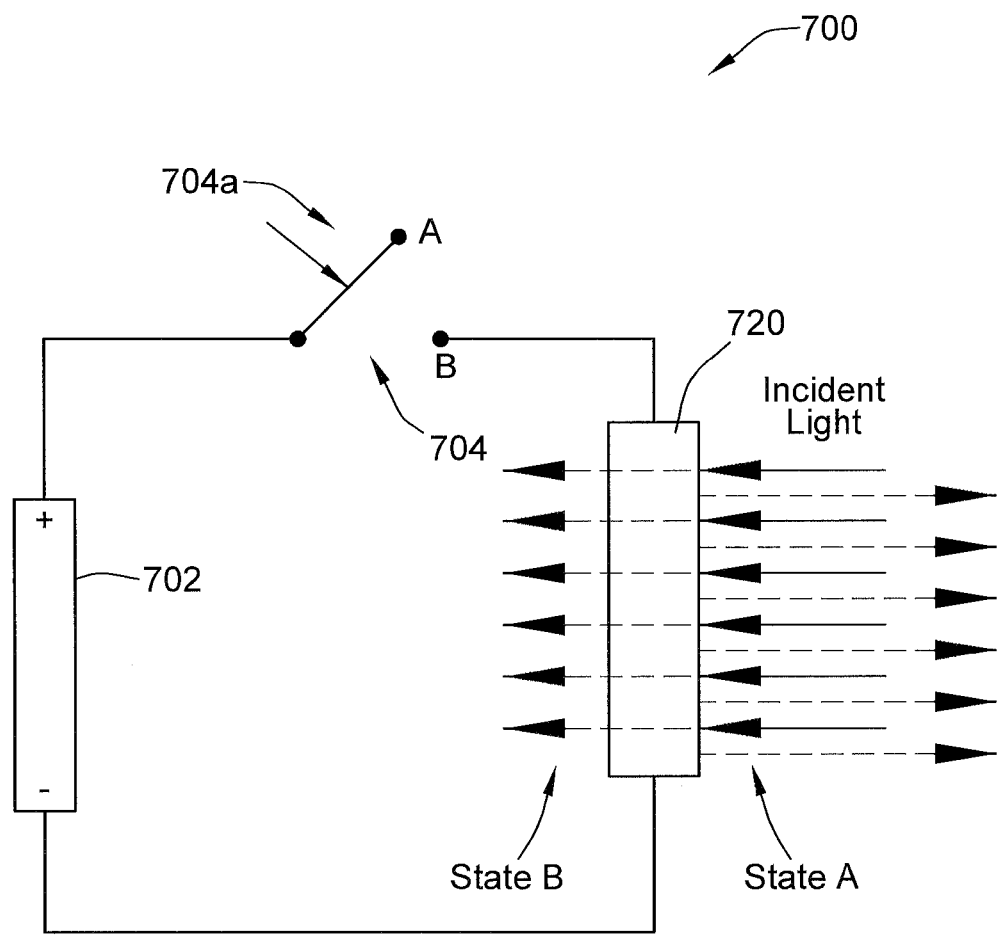
FIG. 7B is a schematic circuit diagram illustrating operation of another example mirror assembly.

FIG. 7B shows an electrically activatable mirror 720 that may be used in a circuit similar to the circuit 700 in FIG. 7A. The electrically activatable material employed in the electrically activatable mirror 720 may be reflective or transmissive. In FIG. 7B, State A is a reflective state and State B is a transmissive state. When in the transmissive state, the electrically activatable material of mirror 706 is switched to a transparent state. The electrically activatable mirror 720 in FIG. 7B may be implemented as described above with reference to FIG. 2D. As described with reference to FIGS. 2D, 3C and 4C, light that passes through the electrically activatable material wherein the material is switched to the transparent state is absorbed by a light absorbing material.

As seen, a method of blocking visible light from reflecting off the reflective surface of a mirror of a mirror assembly is provided. An electrically activatable material (such as material in one or more layers of electrochromatic film) is positioned in front of the reflective surface of the mirror. An electrical power source is electrically coupled to the electrically activatable material. The electrically activatable material is switched from a light-transmissive state, in which light is able to pass through the material, to a light-blocking state in which the electrically activatable material prevents the reflectivity of visible light off the vehicle mirror to reduce observability of the vehicle mirror. In some embodiments, the mirror assembly selectively passes light of a particular spectrum to the reflective surface of the mirror for reflection and blocks out light at wavelengths outside the spectrum. For instance, infrared light may be selectively passed through the electrochromatic material to be reflected off the reflective surface of the mirror. In alternative embodiments, substantially all ambient light may be blocked from reflecting off one portion of the mirror when the electro chromatic material is in the light-blocking state and ambient light may continuously reflect off another portion of the mirror.

Additionally, as seen, a method of utilizing a mirror assembly for a vehicle to reduce observability of the mirror assembly under certain modes of operation is provided. The mirror assembly is provided with an electrically activatable mirror having an electrically activatable material. The electrically activatable material of the mirror is adapted to be switched between a light-transmissive state and a reflective state. The electrically activatable material is coupled to an electrical power source. The material is then switched between the light-transmissive state and the reflective state. The electrically activatable material acts as a switchable mirror and allows light to pass when switched to the light-transmissive state and reflects light off the switchable mirror when switched to the reflective state. The switchable mirror may be switched from being reflective in a de-energized state to being light-transmissive in an energized state. Alternatively, the mirror may be switched from being light-transmissive in a de-energized state to being reflective in an energized state.

The electrically activatable material, in one example, may be positioned adjacent to a light-absorbing material. The electrically acceptable material may further be positioned between a clear cover layer and the light-absorbing layer of the electrically activatable mirror. The electrically activatable material may be prompted to function as a mirror when switched to the reflective state whereby incident light passes through the clear cover layer to reflect off the light-transmissive material. Further, the electrically activatable material may be prompted to become light-transmissive when switched to the light-transmissive state whereby incident light passes through the clear cover layer and through the electrically activatable material to be absorbed by the light-absorbing material.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A mirror assembly for a vehicle, the mirror assembly having a mirror with a reflective surface, comprising:
   an electrically activatable material positioned at the mirror in which the electrically activatable material prevents the reflectivity of visible light off the mirror when the electrically activatable material is in a light-blocking state, wherein the electrically activatable material comprises at least one layer of electrochromatic film;
   a coupling device adapted to electrically couple, at least in part, the electrically activatable material to an electrical power source, wherein the electrical power source comprises at least one of vehicle power, a vehicle battery, and an accessory battery coupled to the vehicle battery; and
   an actuator adapted to switch the electrically activatable material to the light-blocking state such that the electrically activatable material prevents the reflectivity of visible light off the vehicle mirror to reduce the observability of the vehicle mirror.

2. The mirror assembly of claim 1 wherein the at least one layer of electrochromatic film is positioned at a front portion of the reflective surface of the mirror.

3. The mirror assembly of claim 1 wherein the at least one layer of electrochromatic film is positioned between a front clear substrate material and the reflective surface of the mirror.

4. The mirror assembly of claim 1 wherein the mirror assembly is configured to be attached to a military combat vehicle or a security vehicle and wherein the electrically activatable material comprises at least one of:
   (a) suspended particle device (SPD) material;
   (b) liquid crystal display (LCD) material; and
   (c) phase dispersed liquid crystals (PDLCs).

5. The mirror assembly of claim 4 wherein the electrically activatable material is adapted to block out substantially all ambient light from reflecting off the mirror.

6. The mirror assembly of claim 4 wherein the electrically activatable material is adapted to selectively pass light of a particular spectrum to the reflective surface of the mirror for reflection and block out light at wavelengths outside the spectrum.

7. The mirror assembly of claim 4 wherein the electrically activatable material is adapted to selectively pass infrared light to be reflected off the reflective surface of the mirror.

8. The mirror assembly of claim 7 wherein the electrically activatable material selectively passes light ranging from 700 nanometers to 1200 nanometers.

9. The mirror assembly of claim 1 wherein the electrically activatable material further comprises a layer of electrochromatic material overlying one portion of the mirror such that substantially all ambient light is blocked from reflecting off the one portion of the mirror when the layer of electrochromatic material is in the light-blocking state and wherein the mirror has another, portion without a layer of electrochromatic material in which the other portion is adapted to continuously reflect ambient light.

10. The mirror assembly of claim 1 wherein the electrically activatable material becomes opaque upon being electrically energized and the electrically activatable material becomes transparent upon being electrically de-energized.

11. The mirror assembly of claim 10 wherein the electrically activatable material becomes electrically energized upon reaching a voltage potential threshold such that the electrically activatable material does not allow the reflectivity of ambient light off the reflective surface of the mirror when the electrically activatable material is energized.

12. The mirror assembly of claim 10 wherein the electrically activatable material is adapted to block ambient light from reflecting off the mirror upon being electrically energized.

13. The mirror assembly of claim 1 wherein the electrically activatable material becomes opaque upon being electrically de-energized and the electrically activatable material becomes transparent upon being electrically energized.

14. The mirror assembly of claim 13 wherein the electrically activatable material becomes electrically de-energized upon removal of a voltage potential threshold such that the electrically activatable material does not allow the reflectivity of ambient light off the reflective surface of the mirror when the electrically activatable material is electrically de-energized.

15. The mirror assembly of claim 13 wherein the electrically activatable material is adapted to block ambient light from reflecting off the mirror upon being electrically de-energized.

16. The mirror assembly of claim 1 wherein the actuation device is positioned adjacent to the mirror.

17. The mirror assembly of claim 1 wherein the actuator is positioned at a control panel within the vehicle and wherein the actuator comprises at least one of:
   (a) a switch;
   (b) panel touch screen;
   (c) button; and
   (d) sensor.

18. The mirror assembly of claim 1 wherein the actuator comprises at least one of: (a) a hardwired switch; (b) a software switch; and (c) wireless control.

19. The mirror assembly of claim 1 wherein the at least one of the vehicle power, the vehicle battery, and the accessory battery is coupled with a control panel of the vehicle.

20. The mirror assembly of claim 1 wherein the electrical power source comprises the accessory battery and wherein the accessory battery is coupled with the control panel, the control panel is adapted to re-charge the accessory battery based on conditions of a vehicle battery.

21. A mirror assembly for a vehicle, comprising:
   an electrically activatable mirror having an electrically activatable material in which the electrically activatable material is switchable between a light-transmissive state and a reflective state wherein, in the light-transmissive state, light is blocked after passing through the electrically activatable material such that light is not reflected off the mirror;
   a coupling device adapted to couple, at least in part, the electrically activatable material to an electrical power source; and
   an actuator adapted to prompt switching of the electrically activatable material of the mirror of the vehicle between the light-transmissive state and the reflective state.

22. The mirror assembly of claim 21 wherein the electrically activatable material acts as a switchable mirror such that the switchable mirror allows light to pass when switched to the light-transmissive state and reflects light to be reflected off the switchable mirror when switched to the reflective state.

23. The mirror assembly of claim 22 wherein the switchable mirror switches from being reflective in a de-energized state to being light-transmissive in an energized state.

24. The mirror assembly of claim 22 wherein the switchable mirror switches from being light-transmissive in a de-energized state to being reflective in an energized state.

25. The mirror assembly of claim 22 wherein the mirror assembly is configured to be attached to a military combat vehicle or a security vehicle and wherein the electrically activatable mirror further comprises a light-absorbing layer and in which the electrically activatable material is positioned adjacent to the light absorbing material.

26. The mirror assembly of claim 25 wherein the electrically activatable mirror further comprises a clear cover layer, the electrically activatable material is positioned between the clear cover layer and the light-absorbing layer of the electrically activatable mirror.

27. The mirror assembly of claim 26 wherein the clear cover layer is formed of transparent glass or plastic.

28. The mirror assembly of claim 26 wherein the electrically activatable material functions as a mirror when switched to the reflective state such that incident light passes through the clear cover layer to reflect off the electrically activatable material.

29. The mirror assembly of claim 28 wherein the electrically activatable material becomes transparent when switched to the light-transmissive state such that incident light passes through the clear cover layer and through the electrically activatable material to be absorbed by the light-absorbing material.

30. The mirror assembly of claim 22 wherein the electrically activatable material becomes electrically energized upon reaching a voltage potential threshold such that the electrically activatable material becomes light-transmissive when energized.

31. The mirror assembly of claim 22 wherein the electrically activatable material becomes electrically de-energized upon removal of a voltage potential threshold such that the electrically activatable material becomes light-transmissive upon being electrically de-energized.

32. The mirror assembly of claim 22 wherein the actuator is positioned adjacent to the mirror.

33. The mirror assembly of claim 22 wherein the actuator is positioned at a control panel within the vehicle and wherein the actuator comprises at least one of:
   (a) a switch;
   (b) panel touch screen;
   (c) button; and
   (d) sensor.

34. The mirror assembly of claim 22 wherein the actuator comprises at least one of: (a) a hardwired switch; (b) a software switch, or (c) wireless control.

35. The mirror assembly of claim 22 wherein the electrical power source comprises vehicle power and wherein the vehicle power is coupled with a control panel of the vehicle.

36. The mirror assembly of claim 22 wherein the electrical power source comprises a vehicle battery and wherein the vehicle battery is coupled with a control panel of the vehicle.

37. The mirror assembly of claim 22 wherein the electrical power source comprises an accessory battery and wherein the accessory battery is coupled with the control panel, the control panel is adapted to re-charge the accessory battery based on conditions of a vehicle battery.

38. A method of blocking visible light from reflecting off a reflective surface of a mirror in a mirror assembly for a vehicle, comprising:

providing an electrically activatable material at the mirror, the electrically activatable material prevents the reflectivity of visible light off the mirror when the electrically activatable material is in a light-blocking state, wherein the electrically activatable material comprises at least one layer of electrochromatic film;

coupling, at least in part, the electrically activatable material to an electrical power source, wherein the electrical power source comprises at least one of vehicle power, a vehicle battery, and an accessory battery coupled to the vehicle battery; and switching the electrically activatable material from a light-transmissive state to the light-blocking state such that, in the light-blocking state, the electrically activatable material prevents the reflectivity of visible light off the vehicle mirror to reduce observability of the vehicle mirror.

39. The method of claim 38 further comprising positioning the at least one layer of electrochromatic film at a front portion of the reflective surface of the mirror.

40. The method of claim 38 further comprising positioning the at least one layer of electrochromatic film between a front clear substrate material and the reflective surface of the mirror.

41. The method of claim 38 wherein the mirror assembly is configured to be attached to a military combat vehicle or a security vehicle and wherein the electrically activatable material comprises at least one of:
  (a) suspended particle device (SPD) material;
  (b) liquid crystal display (LCD) material; and
  (c) phase dispersed liquid crystals (PDLCs).

42. The method of claim 41 further comprising blocking out substantially all ambient light from reflecting off the mirror.

43. The method of claim 41 further comprising selectively passing light of a particular spectrum to the reflective surface of the mirror for reflection, and
  blocking out light at wavelengths outside the spectrum.

44. The method of claim 41 further comprising selectively passing infrared light to be reflected off the reflective surface of the mirror.

45. The method of claim 44 further comprising selectively passing light ranging from 700 nanometers to 1200 nanometers.

46. The method of claim 38 further comprising substantially blocking all ambient light from reflecting off one portion of the mirror when the electrochromatic material is in the light-blocking state, and
  continuously reflecting ambient light off another portion of the mirror.

47. The method of claim 38 further comprising electrically energizing the electrically activatable material such that the electrically activatable material becomes opaque, and
  de-energizing the electrically activatable material such that the electrically activatable material becomes transparent.

48. The method of claim 38 further comprising electrically de-energizing the electrically activatable material such that the electrically activatable material becomes opaque, and
  electrically energizing the electrically activatable material such that the electrically activatable material becomes transparent.

49. The method of claim 38 further comprising coupling at least one of vehicle power, the vehicle battery, and the accessory battery with a control panel of the vehicle.

50. The method of claim 38 wherein the electrical power source comprises the accessory battery and further comprising coupling the accessory battery with a control panel of the vehicle, and
  recharging the accessory battery based on conditions of the vehicle battery.

51. A method of utilizing a mirror assembly for a vehicle, comprising:
  providing an electrically activatable mirror having an electrically activatable material in which the electrically activatable material is switchable between a light-transmissive state and a reflective state wherein, in the light-transmissive state, light is blocked after passing through the electrically activatable material such that the light is not reflected off the mirror;
  coupling, at least in part, the electrically activatable material to an electrical power source; and
  switching the electrically activatable material of the mirror of the vehicle between the light-transmissive state and the reflective state.

52. The method of claim 51 wherein the electrically activatable material acts as a switchable mirror, and further comprising
  allowing light to pass when the switchable minor is switched to the light-transmissive state, and
  reflecting light off the switchable minor when switched to the reflective state.

53. The method of claim 52 further comprising switching the switchable minor from being reflective in a de-energized state to being light-transmissive in an energized state.

54. The method of claim 52 further comprising switching the switchable minor from being light-transmissive in a de-energized state to being reflective in an energized state.

55. The method of claim 52 wherein the electrically activatable minor is used in connection with a military combat vehicle or a security vehicle and further comprising
  positioning the electrically activatable material adjacent to a light-absorbing material.

56. The method of claim 55 further comprising positioning the electrically activatable material between a clear cover layer and the light-absorbing layer of the electrically activatable mirror.

57. The method of claim 56 further comprising prompting the electrically activatable material to function as a mirror when switched to the reflective state such that incident light passes through the clear cover layer to reflect off the electrically activatable material.

58. The method of claim 57 further comprising prompting the electrically activatable material to become transparent when switched to the light-transmissive state such that incident light passes through the clear cover layer and through the electrically activatable material to be absorbed by the light-absorbing material.

59. The method of claim 52 wherein the electrical power source comprises vehicle power and further comprising coupling the vehicle power with a control panel of the vehicle.

60. The method of claim 52 wherein the electrical power source comprises a vehicle battery and further comprising coupling the vehicle battery with a control panel of the vehicle.

61. The method of claim 52 wherein the electrical power source comprises an accessory battery and further comprising coupling the accessory battery with the control panel, and
  recharging the accessory battery based on conditions of the vehicle battery.

\* \* \* \* \*